United States Patent [19]
Lagerqvist et al.

[11] Patent Number: 5,502,713
[45] Date of Patent: Mar. 26, 1996

[54] SOFT ERROR CONCEALMENT IN A TDMA RADIO SYSTEM

[75] Inventors: Tomas Lagerqvist, Stockholm; Tor B. Minde, Gammelstad; Peter Mustel, Luleä; Hans Nilsson, Spånga, all of Sweden

[73] Assignee: Telefonaktiebolaget LM Ericsson, Stockholm, Sweden

[21] Appl. No.: 162,605

[22] Filed: Dec. 7, 1993

[51] Int. Cl.$^6$ .................................................. H04L 1/20
[52] U.S. Cl. .................. 370/17; 370/95.3; 371/43; 371/48
[58] Field of Search ............... 370/17, 95.3; 371/30, 371/48, 43, 44, 45

[56] References Cited

U.S. PATENT DOCUMENTS

| | | | |
|---|---|---|---|
| 4,688,207 | 8/1987 | Yoshimoto | 370/13 |
| 4,782,489 | 11/1988 | Moulsley | 371/30 |
| 5,148,431 | 9/1992 | Hayashi | 371/30 X |
| 5,303,226 | 4/1994 | Okanove et al. | 370/17 |

FOREIGN PATENT DOCUMENTS

| | | | |
|---|---|---|---|
| 0459358 | 12/1991 | European Pat. Off. | H04B 1/66 |
| 0477377 | 4/1992 | European Pat. Off. | H04M 13/00 |

Primary Examiner—Douglas W. Olms
Assistant Examiner—Russell W. Blum
Attorney, Agent, or Firm—Burns, Doane, Swecker & Mathis

[57] ABSTRACT

In a TDMA cellular telephone system, an error concealment method provides parameter interpolation based on soft quality measures that will enhance the speech quality under bad channel conditions compared to prior methods of repeating previous voice data frames. Specifically, the soft technique of the present invention uses a weighted combination of previous and present frame parameters, where the weighting reflects the probability of error. The present invention will improve the masking of errors compared to hard actions based on a binary detection, especially when the binary detection fails or when the received frame is declared as being "good". The method can also utilize parameter based soft information without increasing the bitrate.

20 Claims, 4 Drawing Sheets

SOFT ERROR CONCEALMENT IN A TDMA RADIO SYSTEM

FIELD OF THE INVENTION

The present invention generally relates to error concealment of speech data in a radio system, and in particular to a method for enhancing erroneous speech frame data in a TDMA cellular telephone system.

BACKGROUND OF THE INVENTION

In a radio system which operates with time division multiple access (e.g., TDMA), data messages and control messages are transmitted in bursts over certain time slots between a base station and one or more mobile stations. The base station and the mobile station both have a transmitter and a receiver side. The transmitter side includes a speech coder, channel coder and a modulator. The receiver side includes corresponding units, namely a demodulator, channel decoder and speech decoder.

Speech to be transmitted from a mobile station to a base station is speech-coded in the transmission side of the mobile station and is divided into speech frames prior to channel coding and transmission in the form of bursts in accordance with the access method (TDMA) concerned. In such transmission systems, where these techniques are used, the voice signal is first coded into digital data usually frame by frame with a frame rate of 20 ms, for example, which equals 160 samples at 8 kHz sampling rate. Next the digital voice data is channel encoded and then transmitted over the channel. At the receiver side the demodulated data is channel decoded and corrected if the data is corrupted. At last, the received voice data is passed to a speech decoder, which regenerates the speech from the voice data. If the received voice data is erroneous, it will result in distorted output speech.

The methods used to improve the performance of such systems are usually referred to as error concealment algorithms or bad frame masking techniques. In general, an error concealment method manipulates the input voice data to the speech decoder to decrease the effects of the transmission errors in the received data. For these techniques to be effective they are highly dependent on an accurate quality measurement. Actions are taken only if the occurrence of errors is detected. Input to the error concealment algorithm except the voice data is information about the "quality" of the data.

It is well known to introduce a so-called BFI (Bad Frame Indicator) into the channel decoder of the various cellular radio systems such as the Global System for Mobile Communication (GSM) or the American Digital Cellular (ADC) system. This gives an indication in the form of a binary signal to the speech decoder on the receiver side, which denotes whether a frame error has occurred or not.

U.S. patent application Ser. No. 08/079,865, entitled, "A Method and an Arrangement for Frame Detection Quality Estimation in the Receiver of a Radio Communication System" filed on Jun. 23, 1993, and incorporated by reference, discloses a quality estimation method which is an improvement over the prior art BFI indication. The method in the co-pending patent application can be used either in the GSM or ADC systems, but the method is described the context of the GSM system. The method of the co-pending patent application improves the quality estimation when detecting information frames (speech or data), by using the soft information that is available in the receiver signal path in conjunction with a so-called neural net, with the purpose of obtaining an error indication which is better and more accurate than the indication given, for instance, by the aforesaid BFI. Such neural nets are known per se, but are applied in a radio receiver for providing improved quality estimation of received information frames (speech or data) in a simple fashion. The method of the co-pending patent application can also be applied to achieve improved quality estimation of parts of a speech frame, for instance a given block or a part of a given block within a speech frame.

In the North American Digital Cellular System which conforms to the Electronic Industries Association Interim Standard 54 (EIA IS-54), an error concealment algorithm is recommended. The quality measurement used to detect erroneous speech data frames is a CRC flag. If no errors are detected the received voice data frame is passed to the speech decoder. If the CRC flag detects an error in the most protected class la bits the previous speech frame energy and spectrum parameters are repeated and passed to the speech decoder. The remaining decoded bits for the frame are passed to the speech decoder without modification.

In the proposed error concealment algorithm of EIA IS-54 both the detection and the masking technique are based on hard actions. The previous accepted frame is used when the CRC detects an error or the present speech frame is used when no CRC error is detected. However, it is not necessarily true that the most optimal solution is to use (1) the unaffected present frame for a CRC which is declared "good" or (2) the previous frame for a detected CRC error.

The CRC check is a hard decision based on a few bits (most sensitive class la bits) and do not detect errors in other bits. It is also possible that the CRC detects errors that are only in the CRC bits or fails to detect errors even if there are errors in the most sensitive bits. There is also the possibility that another stronger signal is demodulated. If it is demodulated correctly, no CRC error will be detected. A CRC error, if indicated, will in this case indicate a fault in this other, stronger signal.

Since the error concealment technique in EIA IS-54 is a hard action based on the binary decision CRC check, the actions do not reflect the probability of errors in the different parameters. A more accurate indication and masking of parameter errors and differentiation of the action for different parameters are not possible. A softer mixture between the good previous frame and the possibly erroneous present frame parameters is not easily and effectively implemented.

By using a soft error concealment technique the speech quality will be improved. The perceived speech quality is enhanced, if a soft mixture between previous and present parameter sets is used. This type of bad frame masking requires a softer error detection and quality measure. The regenerated speech quality will also be improved, if the amount of masking reflects the probability of error for a whole set of parameters or a single parameter. The general problem is to find a soft masking technique that effectively utilizes a soft quality measure.

SUMMARY OF THE INVENTION

The present invention relates to a method that utilizes parameter interpolation to improve the perceived speech quality for erroneous voice data frames in a TDMA radio system. The amount of interpolation is controlled by a quality measure that reflects the probability of error. The interpolation is performed between parameters from previous frames and present received frame. For higher probability of error, estimated by the soft quality measure, more consideration (weight) is given to the parameters of the previous frame.

DETAILED DESCRIPTION OF THE INVENTION

Figure 1:
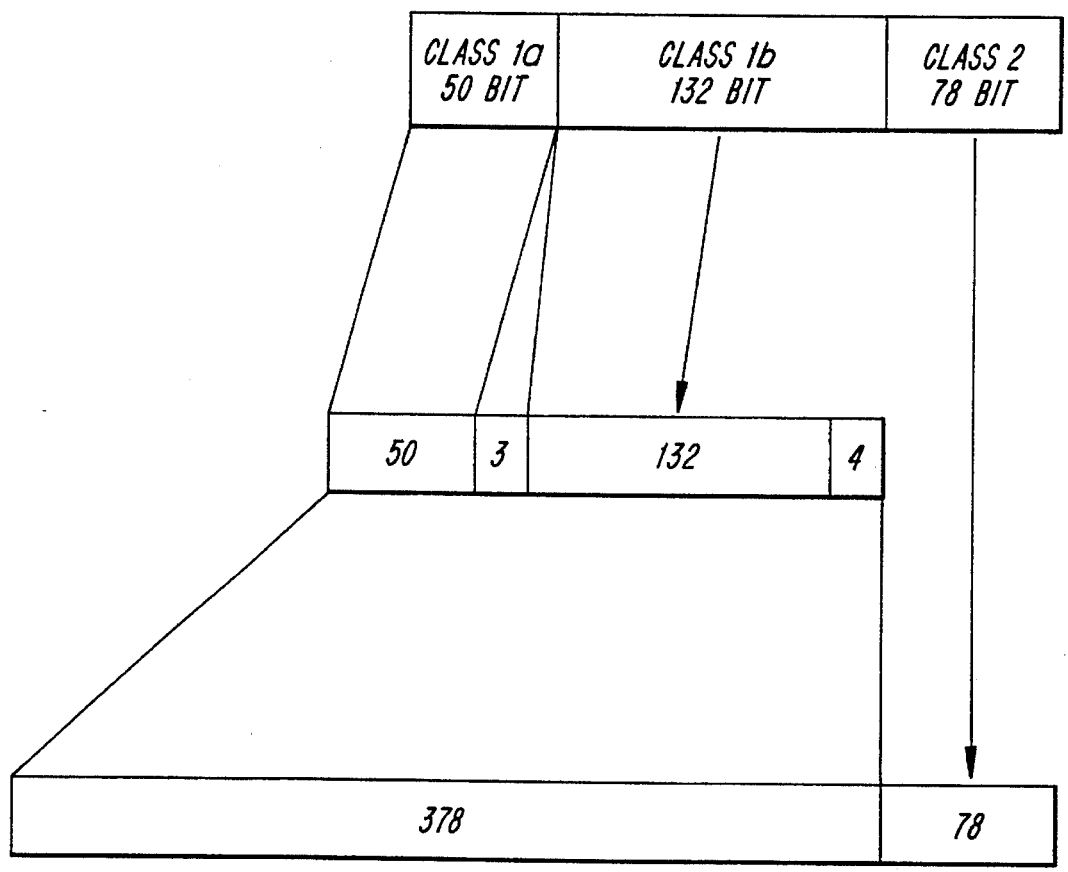
FIG. 1 is a diagram illustrating the configuration of a speech frame.

Shown at the top of FIG. 1 is the configuration of a speech frame which contains originally 260 bits in accordance with what is prescribed in the GSM recommendation, this speech frame is being used in the illustrated embodiment solely by way of example, since the present invention is applicable to other systems, for example, the American Digital Cellular System (ADC).

The speech frame is divided into three blocks of which each defines one of three different classes. One block of 50 bits is assigned to class 1a, one block of 132 bits is assigned to class 1b, and the remaining block of 78 bits is assigned to class 2. The 260 bits are delivered from the speech coder and form the digitized speech after speech coding. A further speech frame of this kind is available after 20 ms, which results in a net bit rate of 13 kbit/s.

Class 1a: The block of bits (50 bits) which are most sensitive to transmission error and which can cause the most difficult consequences with regard to the intelligibility of the transmitted and decoded speech. When errors are found in these bits, large parts of the immediately preceding, correct speech frame are repeated (downtoning) as described in GSM Recommendation 06.11. This error detection is effected with the aid of three parity bits which are added to the 50 data bits as control bits.

Class 1b: The block of bits (132 bits) which is not protected by parity bits. Four bits are added as so-called tail bits. These 132 data bits are not equally as sensitive with regard to the intelligibility to transmission bit errors occurring as the bits in class 1a.

A convolution code is used on the bits included in the class 1a, 1b blocks and the three parity bits and four tail bits.

Class 2: These 78 bits are the least susceptible bits and are not protected at all by additional bits, as in the case of class 1a and 1b.

The three blocks in a speech frame thus contains 50+132+78=260 bits apart from the 3 parity bits and 4 tail bits. Of the 267 (260+7) bits, 53+136=189 bits are convolution coded with the rate =½; i.e., further 189 bits are added.

Thus, a speech frame from the channel coder will include a total of 378+78=456 coded bits, which can be interleaved for inclusion in a plurality of physical TDMA-frames in a known manner.

Figure 2:
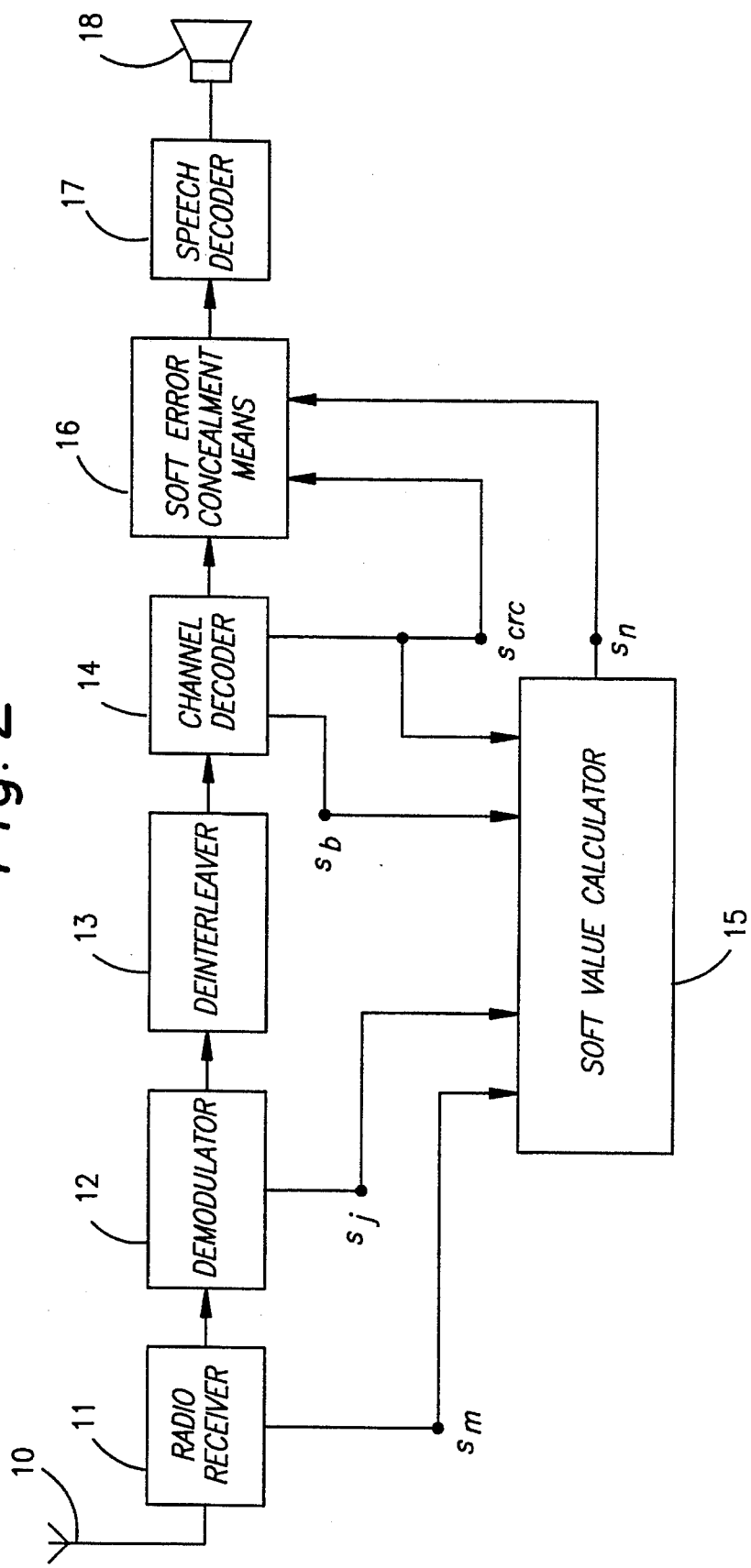
FIG. 2 is a block diagram of a radio receiver.

FIG. 2 is a block diagram illustrating that part of a radio receiver for time division multiple access (e.g., TDMA) with which the disclosed method is concerned, and also shows an arrangement according to the present invention.

An antenna 10 of the receiver of a mobile telephone apparatus, for instance, receives radio signals over a certain radio channel. The signals (data/speech messages) transmitted over this channel may become strongly distorted, for instance due to fading, so that the TDMA-bursts give rise to a highly distorted speech frame.

Demodulation takes place in the radio receiver 11 at a given radio frequency (in the GSM-system 865–935 MHz) in a known manner, so as to obtain a baseband modulated signal. The level of the radio signals incoming to the radio receiver 11 can be measured and are referenced $s_m$ in FIG. 2.

The baseband modulated signal is demodulated in the demodulator 12 within the IF-range, this demodulator also including an equalizer for compensating or correcting the multipath propagation to which the incoming signal has been subjected during transmission, in a known manner. For example, a Viterbi equalizer can be used in this regard.

So-called soft information, as described in more detail in the above-referenced co-pending patent application, is obtained from the equalizer in the demodulator 12, this soft information being available and referenced $s_j$ in FIG. 2. This soft information may consist particularly of the information obtained subsequent to a first preliminary equalization of the baseband signal.

A deinterleaver 13 is connected downstream of the demodulator/equalizer 12 and recovers the time divided bursts intended for the receiver, in a known manner.

The main function of the channel decoder 14 is to perform the opposite to the operation performed by the channel coder on the transmitter side, i.e., to recover transmitted information from the known redundant bits and the known channel coding (e.g., a convolution code). The channel decoder 14 may also estimate the bit error rate (BER), for instance by encoding the received and decoded information bits and comparing the result with the bits received from the deinterleaver 13. The difference constitutes a measurement of the bit error rate. The channel decoder 14 also provides a measurement as to how bad, or erroneous, a full speech frame is, so-called bad frame indicator BFI. This quantity called CRC (cyclic redundancy check) is specified in the GSM-recommendation 05.05. Thus, there can be recovered from the channel decoder 14 a signal $s_b$ which is a measurement of the bit error rate (BER) in the received demodulated and equalized radio signal, and a signal $s_{CRC}$ which indicates whether an error has occurred in the class 1a-block. Other soft values can also be used as mentioned later.

The decoded speech frames are delivered from the channel decoder 14 to the speech decoder 17 speech-frame by speech-frame, via a soft error concealment means 16. The soft error concealment means 16 is preferably a state machine that is implemented in software, and it is responsible for carrying out the functions of the present invention. A complete synthesis of received speech frames is effected at the speech decoder 17 in order to deliver speech signals to a sound reproduction unit 18 in the mobile station.

A so-called neural net or some other soft value calculator 15 may also be arranged on the receiver side of the mobile station, this net coacting with the speech decoder 17 and the soft error concealment means 16, with the purpose of obtaining a better and more accurate estimation of the quality of the received speech frames than that which can be obtained with the aforesaid frame indicator BFI, for instance.

The purpose of the present invention is to improve the speech quality by using quality measures other than a CRC flag, to be used when the CRC flag does not indicate an error, and by making a soft frame masking by interpolation of speech frame data.

Basically, the invented method can be described by the following formulation:

$$Pi(0) = IFUNC( Pi(j), q(j), P(0), q(0) )$$

$Pi(0)$ is the interpolated parameter of present frame, $j=0$. IFUNC is the interpolation function, $Pi(j)$ is the previous frame's parameters where j is the frame number $j=-1,-2...$, $q(j)$ is the quality measures for the previous frames, $P(0)$ is the received parameter for the present frame $j=0$, and $q(0)$ is the quality measure for the present frame $j=0$. The function $Pi(0)$ can be any type of interpolation function, and the present invention is not limited to a particular interpolation function.

Implicitly in this formulation is that the interpolation function can be different for different parameters. It is, therefore, possible that the present invention can utilize several parameters and different interpolation functions. As used in the present application the expression parameter value means a coefficient in the speech decoder process that is quantitized and sent from the transmitter to the receiver. The amount of interpolation, used previous parameters and type of quality measures depend on the parameter and the method can be optimized separately for each parameter. Also, other types of error recovery strategies for a parameter or a reconstructed signal can be used in conjunction with this interpolation method. For example, a state machine as described later can be combined with this method.

The interpolation can result in a reconstruction value for the parameter $Pi(0)$ that can be used directly by the speech decoder, for example, when the speech decoder is located at the base station. The interpolation can also result in a codeword for the parameter, which needs to be decoded and reconstructed to the parameter value in the speech decoder. This is used if the error concealment algorithm and the speech decoder are separated apart by a communication channel, for example, when the speech decoder is located at a mobile services switching center (MSC) and the error concealment algorithm is employed at the base station. In the same way, the values used by the interpolation function $Pi(j)$, $q(j)$, $P(0)$ and $q(0)$ can be either reconstruction values or codewords. The interpolation function then takes care of the decoding and reconstruction if the values are codewords. The decoding is usually a table lookup.

The interpolation function can either be nonlinear or linear. In the linear case the interpolated value is a linear combination of the previous and present frame parameters. The weights in the linear combination are controlled by the quality measurement. Below is the linear combination shown.

$$Pi(0) = \mathop{\text{SUM}}_{j=-1}^{-N} wj*Pi(j) + w0*P(0)$$

$wj$ is the weight for the frame j, wherein N is the number of previous frames used. The weights $wj$ are a function w of the quality measurement $q(0)$.

$$wj = w(q(0)) \; j=0..-N$$

Usually the sum of the weights is $$\mathop{\text{SUM}}_{j=0}^{-N} wj = 1$$

One example of nonlinear interpolation is to let the weights depend on, be a function of, the previous parameters $Pi(j)$ and previous quality measures $q(j)$.

Figure 3:
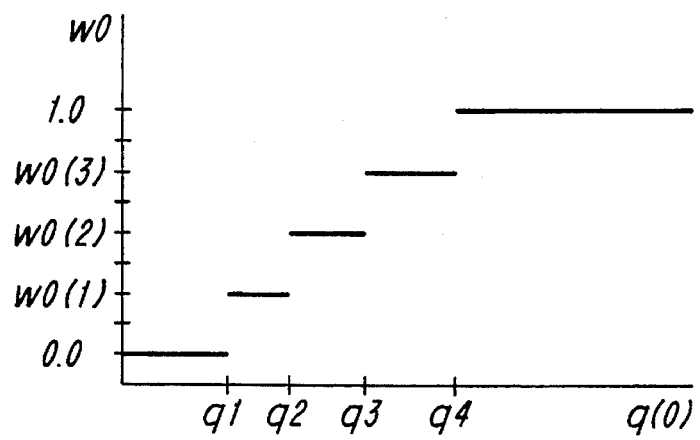
FIG. 3 is a chart useful in describing the operation of the present invention.

The function used to calculate the weights from the quality measurement can be a step function. A step function is easily implemented as a table lookup, like a quantization process. An example can be given with two weights w0 and w-1. w0 is the weight for the present frame parameter and w-1 is the weight for the previous frame parameter. $w-1 = 1-w0$, where the function $w0(q(0))$ is shown in FIG. 3.

The table lookup process is implemented by storing the input quality measurement decision values q1–q4 and its associated weights w0(0)–w0(4) (w0(0)=0.0, w0(4)=1.0). The calculation function is then implemented as

```
i=1
WHILE  q(0) > qi DO
i=i+1
w0 = w0(i - 1)
```

In the linear case the weight calculation is a transformation of the quality measurement to a weight by continuous mapping.

In the example given, a high value for $q(0)$ indicates a correctly received parameter and hence the weight w0 equals 1.0. A low value $q(0)$ indicates low reliability and the weight is set to zero. In between the weight is increased in steps according to the quality measure to reflect the increased reliability.

A binary decision like the CRC flag can either override (logical OR) this weight calculation or be combined with the weight function (more like logical AND). In the first case the weight calculation is only used when the binary flag indicates a correctly received parameter. In the second case the weight function can be used when the quality measure is above a certain threshold. Below the threshold the binary flag overrides the weight calculation. This can also be implemented as a shift to the right of the step function in FIG. 3. In that case the decision values qj=qjok+s(flag), where qjok is the same as in FIG. 3 and s(flag) = shift value >0 when flag=1 and s(flag)=0 when flag=0. This means that when the CRC flag detects an error, i.e., CRC flag =1, the quality measure for the parameter needs to be larger to result in the same weighting.

The quality measure can either be a single parameter or a combination of different parameters. The important aspect is the precision of the measure and a high correspondence (correlation) between the measure and the probability of error. The quality measure can be valid for a whole frame, for subblocks of the frame, for separate parameter sets or for single parameters.

To combine different quality measures (soft information) a neural network can be used as disclosed in co-pending patent application Ser. No. 08/079,865 and as shown in FIG. 2. In that case different soft values are applied to the input of the neural network that is trained to form single quality measurements. The soft information that can be used as inputs to the neural network or as quality measures except the values Viterbi decoder metrics, estimated BER, signal strength, estimated phase error, radio signal level and CRC flags mentioned in co-pending patent application Ser. No. 08/079,865 are the DVCC flag (DVCC=digital verification color code), the synchronization error and the estimated fading rate. Some of these values are valid for the whole frame and others as detailed as for one bit of the frame. The soft values that are valid for one bit can be combined to form a single soft value for a parameter or a set of parameters. This combination can be calculated as weighted linear combination shown below.

$$q(0) = \sum_{i=0}^{B-1} w(i) * qb(i)$$

Where q(0) is the single parameter soft value, B is the number of bits in the parameter, w(i) are the weights for each single bit soft and qb(i) are the single bit soft values. The weights in the combination are used to reflect the importance in the aspect of quality of each bit in the parameter and how much they contribute to the final parameter value.

The parameters, for which this error concealment technique is useful, need to have some correlation between successive frames or subblocks of the frame. The method can be used for any type of speech coding technique. A CELP (Code Excited Linear Predictive) codec as in the EIA Interim Standard 54 can be used as an example. In such a coder, this error concealment technique can be used for the frame energy parameter, the LPC (Linear Prediction Coding) parameters, LTP (Long Term Prediction) parameters and the innovation codebook gains. The frame energy and the LPC parameters are usually updated every frame and hence the interpolation technique is used over successive frames. A single quality measure for the frame or quality measures for each parameter are needed in this case. The LPC parameter interpolation can be performed in any domain such as reflection coefficients, log area ratios, line spectral frequencies or transversal filter coefficients. The LTP predictor parameters and codebook gains are usually updated every subblock of the frame (e.g., four subblocks). In this case, the interpolation is performed for successive subblocks and for this a single quality measure for the subblock or quality measures for each parameter is needed in the weighting calculation.

Figure 4:
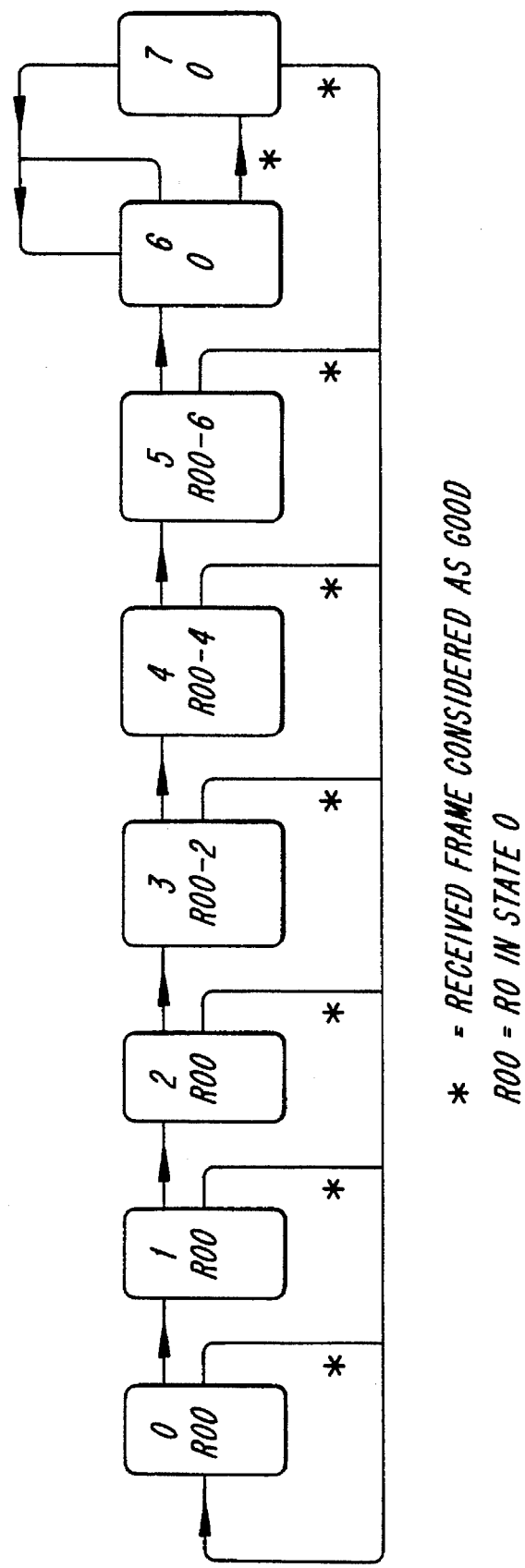
FIG. 4 is a block diagram of a state machine.

One way to implement the bad frame masking technique is to combine it with a state machine with eight states, that is illustrated in FIG. 4. The state is updated every frame. A specific implementation of the present invention will now be explained in connection with FIGS. 4 and 5, where the invention is implemented in a state machine.

The normal state is state 0. When the received information is considered as bad, i.e., (1) the CRC checksum is not correct, or (2) the soft quality value is lower than a threshold Q1 (see FIG. 5), or (3) the frame consists of FACCH data, the state machine moves to the next state. As used in the present application, the expression quality value means a measurement that reflects the received quality of a block, parameter or bit. If the soft quality value is higher than Q1 but lower than Q3 the incoming frame data is interpolated with the last accepted frame (see FIG. 5). However, the interpolated frame is considered as good and the speech Decoder remains in state 0.

If a good frame is received after a bad frame, the state machine returns to state 0, otherwise it advances to the next state.

If six consecutive frames have been considered as bad the state machine is in state 6. In order to return to state 0, one frame must have been considered as good.

Different actions are taken depending on which state the machine is in:

In state 0 no actions are taken.

In state 1 the received frame parameters (RC and LPC1-LPC10) are replaced by the previous, good frame's parameters.

The same action is taken in state 2 as in state 1.

In state 3 the replacement of frame parameters is done again. Also, the value of R0 is decreased by 2, which results in a 4 dB attenuation of the frame energy.

In state 4 the replacement is done again, and R0 is decreased again by 2.

The same actions are taken in state 5 as in state 4.

In state 6 R0 is set to the value 0 which means that no speech signal is heard.

In state 7 R0 is still set to 0.

Figure 5:
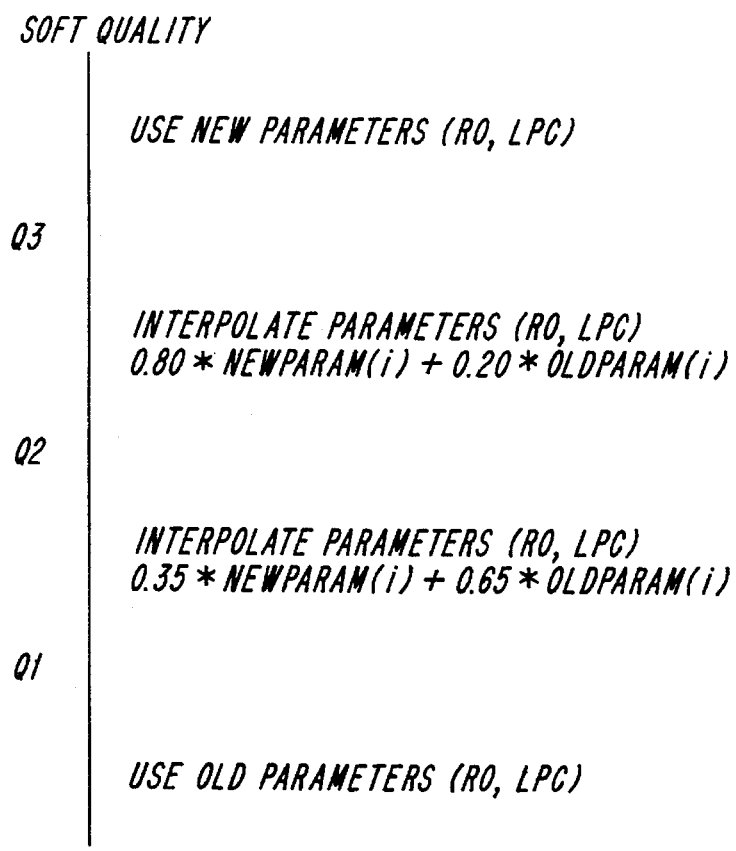
FIG. 5 is a chart useful in explaining the operation of the present invention.

As mentioned above, the state machine of FIG. 4 is only a representation of a specific implementation of the present invention, and the present invention is not limited to the configuration illustrated in FIGS. 4 and 5.

While the invention has been described in its preferred embodiments, it is to be understood that the words which have been used are words of description rather than limitation and that changes may be made within the purview of the appended claims without departing from the true scope and spirit of the invention in its broadest aspects.

We claim:

1. A method for enhancing the quality of a present speech frame in a TDMA radio system of the type utilizing convolutional coding by determining an interpolated parameter of the present speech frame, which comprises the steps of:

determining a quality value and a selected parameter value for the present speech frame which includes convolutional coding;

determining a quality value and a selected parameter value for at least one first previous speech frame which includes convolutional coding; and calculating the interpolated parameter of the present speech frame using an interpolation function that utilizes at least the quality value and the selected parameter value of the present speech frame and the first previous speech frame.

2. A method according to claim 1 which further includes the step of determining a quality value and a selected parameter value for at least one other previous speech frame.

3. A method according to claim 1 wherein the interpolation function is a linear function.

4. A method according to claim 3 wherein the linear interpolation function includes at least one weight which is a function of the quality value of the present frame.

5. A method according to claim 4 wherein the weight is calculated from a step function that is implemented with a lookup table.

6. A method according to claim 1 wherein the interpolation function is a non-linear function.

7. A method according to claim 6 wherein the nonlinear function includes at least one weight which is a function of the parameter value and quality value of the previous speech frame.

8. A method according to claim 1 wherein the interpolated parameter is employed in conjunction with a reconstruction values in order that a speech decoder can directly use the present speech frame.

9. A method according to claim 1 wherein the interpolation function is employed in conjunction with codewords.

10. A method according to claim 1 wherein a plurality of parameter values and different interpolation functions are utilized.

11. A radio system for receiving TDMA signals of the type utilizing convolutional coding, comprising:

means for receiving signals that are convolutionally coded into channels, means for demodulating the signals received by said receiver;

means for decoding the channels of the demodulated signals into speech frames;

means for concealing errors in the information included in the speech frames; said means for concealing errors including means for determining a quality value and a selected parameter value for a present speech frame which includes convolutional coding, means for determining a quality value and a selected parameter value for at least one first previous speech frame which includes convolutional coding; and means for calculating the interpolated value of the present speech frame using an interpolation function that utilizes at least the quality value and the selected parameter value of the present speech frame and the first previous speech frame;

means for decoding the speech frame in accordance with the interpolated value calculated by said means for concealing errors; and means for reproducing the signals in accordance with the decoded speech frames.

12. A radio system according to claim 11 which further includes means for determining a quality value and a selected parameter value for at least one other previous speech frame.

13. A radio system according to claim 11 wherein the interpolation function is a linear function.

14. A radio system according to claim 13 wherein the linear interpolation function includes at least one weight which is a function of the quality value of the present frame.

15. A radio system according to claim 14 wherein the weight is calculated from a step function that is implemented with a lookup table.

16. A radio system according to claim 11 wherein the interpolation function is a non-linear function.

17. A radio system according to claim 16 wherein the non-linear function includes at least one weight which is a function of the parameter value and quality value of the previous speech frame.

18. A radio system according to claim 11 wherein the interpolated parameter is employed in conjunction with reconstruction values in order that the means for decoding can directly use the present speech frame.

19. A radio system according to claim 11 wherein the interpolated function is employed in conjunction with codewords.

20. A radio system according to claim 11 wherein a plurality of parameter values and different interpolation functions are utilized.

* * * * *